United States Patent
Fry

(10) Patent No.: US 6,763,055 B1
(45) Date of Patent: Jul. 13, 2004

(54) SPREAD SPECTRUM FREQUENCY HOPPING TRANSCEIVER MODULATION INDEX CONTROL

(75) Inventor: Terry L. Fry, Davidsonville, MD (US)

(73) Assignee: Zeus Wireless, Inc., Columbia, MD (US)

(*) Notice: Subject to any disclaimer, the term of this patent is extended or adjusted under 35 U.S.C. 154(b) by 0 days.

(21) Appl. No.: 09/538,779

(22) Filed: Mar. 30, 2000

(51) Int. Cl.[7] .............................................. H04B 1/713
(52) U.S. Cl. ...................... 375/132; 375/135; 375/376
(58) Field of Search ................................ 375/132, 133, 375/134, 135, 376

(56) References Cited

U.S. PATENT DOCUMENTS 6,188,715 B1 * 2/2001 Partyka ....................... 375/134

* cited by examiner

Primary Examiner—Temesghen Ghebretinsae
(74) Attorney, Agent, or Firm—Hamilton, Brook, Smith & Reynolds, P.C.

(57) ABSTRACT

A frequency hopping, spread spectrum transceiver for wireless data telemetry directly modulates data for transmission using minimum shift keying (MSK) modulation; the transceiver includes a transmit Voltage Controlled Oscillator (VCO) to provide an input to a modulator. A programmable attenuator circuit is used between the source of transmit data, the micro processing unit (MPU), and the transmit phase locked loop (PLL) summing junction. The programmable attenuator provides a selectively attenuated data signal that is coupled to the PLL summing junction to generate a modulated data signal for transmission and dynamically adjusts the transmit data stream voltage level as required to achieve a fixed level in frequency deviation based on the present VCO operating frequency. A complete set of VCO characterization measurements is obtained beforehand. The VCO characterization measurements are stored in memory and the MPU controls the attenuation circuit to provide the exact Transmit Data signal level required for optimum modulation depth.

2 Claims, 5 Drawing Sheets

SPREAD SPECTRUM FREQUENCY HOPPING TRANSCEIVER MODULATION INDEX CONTROL

BACKGROUND OF THE INVENTION

1. Field of the Invention

The present invention relates to wireless data telemetry system utilizing spread spectrum frequency hopping transceivers, and, more particularly, to circuits and methods for selectively controlling modulation depth when transmitting data.

2. Discussion of the Prior Art

Wireless data telemetry methods have been well documented; infrared and radio frequency (RF) are the principal wireless communication technologies described in the prior art. Infrared beam communications systems cannot operate over distances of more than a few feet and so are limited to applications such as bar code scanning, local computing devices, and television (or other home appliance) remote control.

Accordingly, most wireless data transmission products in the prior art utilize standard RF technology, i.e., radios, the same technology used in vehicle dispatch and police communication systems. Standard RF products are relatively simple and inexpensive to build but require FCC licenses to operate. RF transmissions are susceptible to interference from a growing number of sources and to interception by readily available eavesdropping equipment. The unreliable quality of standard RF transmissions makes the technology unsuitable for applications where all of the information transmitted must be accurate, complete, and secure.

In order to overcome the shortcomings of standard RF transmission, direct sequence spread spectrum (DSSS) was developed. DSSS radios divide or slice transmissions into small bits thereby spreading energy from the bits simultaneously across a wide range or spectrum of radio frequencies. DSSS is a relatively unreliable transmission medium, however, because spreading the message across a wide spectrum greatly reduces the strength of the radio signal carrying the message weakening the signal. A DSSS receiver must simultaneously monitor the entire allotted spectrum, thereby risking severe interference from any high energy RF source appearing within the monitored spectrum. DSSS performance also degrades quickly in shared-service environments having multiple radio systems operating simultaneously.

Frequency hopping spread spectrum (FHSS) technology was developed by the U.S. military to prevent interference with or interception of radio transmissions on the battle field and is employed by the military in situations where reliability and the coexistence of multiple radio systems are critical. Standard RF and DSSS cannot match the reliability and security provided by frequency hopping. Instead of spreading (and therefore diluting) the signal carrying each bit across an allotted spectrum, as in DSSS, frequency hopping radios concentrate full power into a very narrow spectral width and randomly hop from one frequency to another in a sequence within a defined band, up to several thousand times per second. Each FHSS transmitter and receiver coordinate their hopping sequence to ensure a reliable exchange of data. Upon encountering interference on a particular frequency, the transmitter and receiver retain the affected data, hop to another point in the spectrum and then continue the transmission. Statistically, there are always spaces without interference somewhere in the spectrum, since benign producers of interference or a hostile jammer cannot easily jam all possible frequencies simultaneously and at high power radiation levels.

The frequency hopping transmitter and receiver find frequencies with no interference and complete the transmission. This ability to avoid interference enables FHSS radios to perform more reliably over longer ranges than standard fixed channel RF or DSSS radios. In the past, frequency hopping communication systems have been used almost exclusively in extremely expensive robust military or government communication systems.

Generally speaking, data telemetry is the transmission of short packets of information from equipment or sensors to a recorder or central control unit. The data packets are transferred as electric signals via wire, infrared or RF technologies and data is received at a central control unit such as a computer with software for automatically polling and controlling the remote devices. The control unit analyzes, aggregates, archives and distributes the collected data packets to other locations, as desired, via a local area network (LAN) and/or a wide area network (WAN). Wireless data telemetry provides several advantages over data telemetry on wired networks. First, wireless systems are easier to install; second, installation and maintenance costs can be much lower, and third, operations can be reconfigured or relocated very quickly without consideration for rerunning wires. Fourth, wireless telemetry offers improved mobility during use.

The Federal Communications Commission (FCC) has designated three license-free bandwidth segments of the radio frequency spectrum and made them available for industrial, scientific and medical (ISM) use in the United States. These three segments are 900 MHZ, 2.4 GHz and 5.8 GHz. Anyone may operate a wireless network in a license-free band without site licenses or carrier fees, and is subject only to a radiated power restriction (i.e., a maximum of one watt radiated power). The radio signals transmitted must be spread spectrum. Foreign national spectrum regulation organizations and international telecommunications bodies have also agreed to recognize a common license-free ISM frequency at 2.4 GHz, and so a defacto international standard for license-free ISM communications has emerged. The ISM band at 2.4 GHz provides more than twice the bandwidth capacity (and is subject to far less congestion and interference) as compared to the ISM band at 900 MHZ. Several industrial nations do not permit a license-free ISM band at 900 MHZ and relatively few nations have a license-free ISM band of 5.8 GHz. However, the United States, Europe, Latin America and many Asian countries have adopted an ISM band at 2.4 GHz, the only band which so many nations offer for license-free operations.

What is needed, then, is an inexpensive, easy to use and robust data telemetry and communication system which will dynamically establish and maintain communication links, preferably operating in the common license-free ISM frequency band and providing reliable communications for a variety of users in commercial and industrial environments.

The applicant has recognized that spread spectrum transceivers pose a number of challenges not addressed by vendors of off-the-shelf RF components. For example, when switching from receive mode to transmit mode, an appropriate Voltage Controlled Oscillator must be activated and input to a modulator for transmitting data over a wide range of frequencies. Often, the modulator input sensitivity varies with transmit frequency, thus leading to a variation in modulation index for the transmitted data, with some frequencies having less than optimal modulation depth. Suboptimally modulated data can diminish overall system performance by severely limiting range. The receiver of poorly modulated data has less signal to noise ratio margin for those frequencies subject to sub-optimally modulated data.

SUMMARY OF THE INVENTION

In accordance with the present invention, a frequency hopping spread spectrum communication system is adapted to dynamically establish and maintain communication links. The system is economically implemented at 2.4 GHz, provides an optimum balance between data rate and range and provides 9.6 kilobits per second (9.6 Kbps) data transmission over an outdoor line of sight range of approximately 35thousand meters. The communication system includes components ideally suited to specific wireless data telemetry applications. A transceiver is configured on two printed circuit cards and includes RF and computer control components in a compact package approximately the size of a deck of cards. Each transceiver includes a shielded RF board or module with a frequency hopping transmitter and receiver, an antenna, and a digital control board or module. An application interface is included to communicate with specific OEM products utilizing serial (transistor/transistor logic, TTL) or other standard interfaces. The transceiver transmits or receives on any of 550 independent, non-interfering frequencies and functions as a half duplex, bi-directional communication device. The transmit and receive functions are time interleaved in a non-overlapping fashion, consistent with the requirements of a frequency hopping radio. The transmit interval is restricted to less than 0.4 seconds on any particular frequency within a 30 second interval. In the course of a normal information exchange, a given transmission is generated on a frequency selected from a set of all available hop frequencies. The transmission is limited in duration to the availability of incoming data, and following the transmission, the radio switches to a receive mode and processes any incoming data. Once reception is complete, the transmit interval/receive interval cycle is restarted on a new frequency selected from the hop frequency set. Transmit receive cycling continues until all 75 unique frequencies in the set have been used, whereupon the frequency selection process reenters the top of the table and begins reusing the same 75frequencies.

Transmitted data is directly modulated onto a synthesized carrier by use of minimum shift keying (MSK) modulation. First and second local oscillators (LOs) are controlled in frequency by use of a single loop indirect frequency synthesis. Samples of both first and second voltage controlled oscillators (VCOs) are divided down using phase-locked loop integrated circuit elements, where each sample is compared to an onboard 8 MHZ crystal reference oscillator. During the transmit interval, a single transmitter VCO is controlled by the same device and in the same manner.

The basic transmitted signal is generated by a voltage-controlled-oscillator (VCO) that operate's in the 2.4 to 2.4835 GHZ frequency band. The signal is then amplified by three stages of amplification. All three amplification stages and the VCO are switched ON for transmit and switched OFF for receive.

The frequency synthesizer generates the modulated transmit signal which is phase locked to the on-board 8 MHZ reference oscillator. The 8 MHZ reference is a crystal oscillator that is controlled by the off-board microprocessor. To enable a cost effective solution for the reference oscillator, an inexpensive crystal is utilized. Because a frequency tolerance of 3 parts per million (ppm) must be maintained for the transceiver to communicate, a frequency compensation routine is programmed in the microprocessor. The compensation deals with both the initial crystal manufacturing tolerance and maintaining tolerance over the specified −20 to 60 degrees Celsius temperature range.

The transmitted signal is generated by a VCO that is switched on during transmit and operates over a 350 MHZ tuning range roughly centered on 2.44 GHz. During operation, the VCO only tunes in the 2.4 to 2.4835 GHz band. Having a larger tuning range allows for manufacturing tolerances without the need to tune the oscillators for each manufactured board. During operation, the synthesizer chip is programmed to the required hop frequencies.

As noted above, it was recognized that when switching from receive mode to transmit mode using a classical phase-locked-loop (PLL) circuit, the modulator input sensitivity varied with transmit frequency, thus leading to a variation in modulation index for the transmitted data, with some frequencies having less than optimal modulation depth. In order to overcome this problem, a circuit was developed for use between the source of transmit data, the micro processing unit (MPU), and the transmit PLL summing junction. The circuit is called a programmable attenuator, which provides a selectively attenuated signal that is coupled into the PLL summing junction to generate a modulated data signal for transmission.

The programmable attenuation circuit dynamically adjusts the transmit data stream voltage level required to achieve a fixed level in frequency deviation based on the current operating frequency. Each VCO will provide a specific change in frequency for a given change in input control voltage signal; the change will be dependant, in part, on the present, pre-adjustment frequency. In accordance with the method of the present invention, the specific change in frequency for a given change in input control voltage signal is predicted after first having obtained a complete set of VCO characterization measurements. Those characterization measurements are stored in memory and the MPU is programmed to control the programmable attenuation circuit, providing the exact selectively attenuated data signal level required for the VCO input control signal at the required frequency.

BRIEF DESCRIPTION OF THE DRAWINGS

FIG. 5 illustrates an ideal VCO transfer function, Frequency as a function of Voltage (Vin) in.

FIG. 6 illustrates a typical VCO transfer function, Frequency as a function of Voltage (Vin) in.

FIG. 7 illustrates an arbitrary, yet characterizable, VCO transfer function, Frequency as a function of Voltage (Vin) in.

DESCRIPTION OF THE PREFERRED EMBODIMENT

Figure 1:
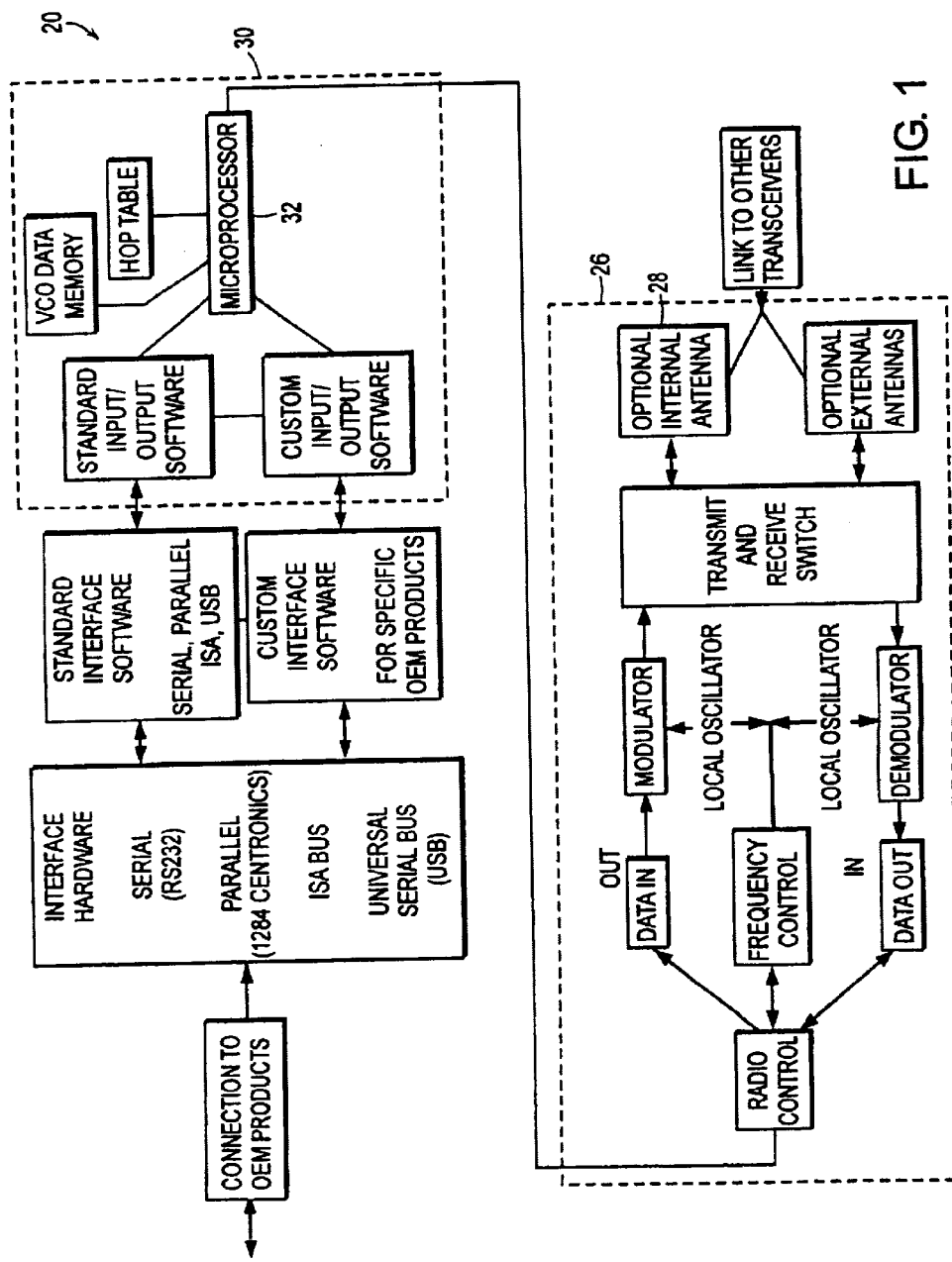
FIG. 1 is a block diagram of a frequency hopping spread spectrum transceiver, in accordance with the present invention.
Figure 2:
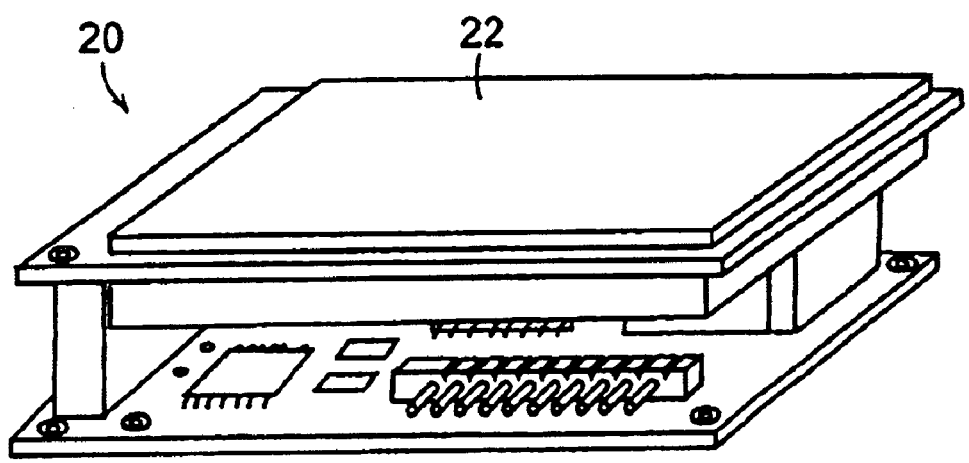
FIG. 2 is a perspective view of the transceiver of FIG. 1, in accordance with the present invention.

A frequency hopping spread spectrum communication system for dynamically establishing and maintaining communication links is economically implemented at 2.4 GHZ and includes components ideally suited to specific wireless data telemetry applications. As shown in FIGS. 1 and 2, a long range transceiver 20 is configured as a pair of stacked printed circuit cards having a shielded RF board 22. Transceiver 20 includes RF and computer control components in a compact package approximately the size of a deck of cards and is adapted to be built into original equipment manufacturer (OEM) products to support a wide range of wireless data telemetry applications.

As best seen in FIG. 1, transceiver 20 includes shielded RF board 22 or module with a frequency hopping transmitter and receiver 26, an antenna 28, and a digital control board or module 30 including a micro processing unit (MPU) 32. The digital control module performs RF module and application interface control functions and an application interface is included to communicate with specific OEM products utilizing serial (transistor/transistor logic, TTL) or other standard interfaces. Transceiver 20 operates in the license-free portion of the FCC designated ISM frequency band at 2.4 GHz; transmitting and receiving data at 9.6 Kbps at ranges of up to 1500 feet when used indoors with the integrally housed antenna 28. The transceiver transmits or receives on any of 550 independent, non-interfering frequencies. When using the transceiver, a data telemetry network can readily be configured for either point-to-point (e.g. wire replacement) or host-to-multipoint networks linked to a user's existing computer or to telephone networks via a system gateway. Optionally, up to 5 collocated independent networks may operate simultaneously, and data security is provided by rapid and random frequency changes (i.e., frequency hopping); transceiver 20 can optionally be used with data encryption software for providing secure, coded transmissions.

Figure 3:
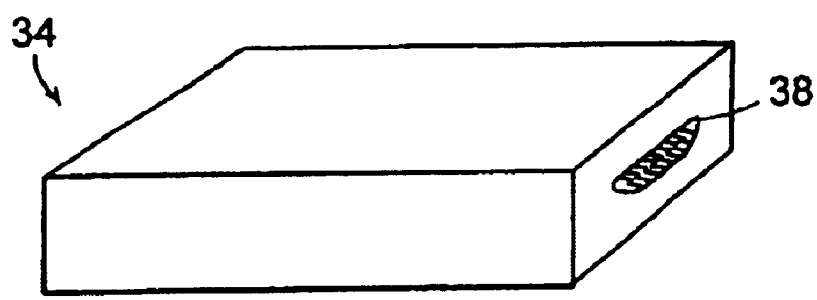
FIG. 3 is a perspective view of a long range connector, in accordance with the present invention.

Alternatively, a long range connector transceiver 34 as shown in FIG. 3 can be attached to a computer or other device using a standard serial (RS232) port. The long range connector duplicates the functions of transceiver 20 but is housed in an enclosure with an RS232 compatible connector 38. Long range connector 34 can be used with a wide variety of existing products such as cash registers, ATM machines, laptop computers or any other computer controlled device having an RS232 port.

Figure 4A:
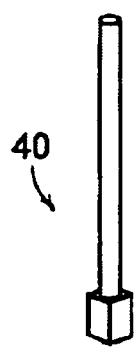
FIG. 4a is a perspective view of an omni-directional antenna adapted for use with the transceiver of FIG. 1, in accordance with the present invention.
Figure 4B:
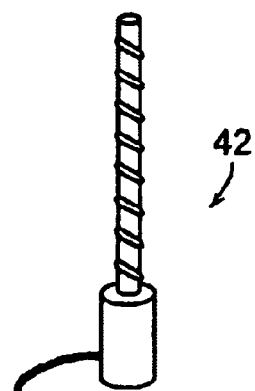
FIG. 4b is a perspective view of a larger omni-directional antenna adapted for use with the transceiver of FIG. 1, in accordance with the present invention.
Figure 4D:
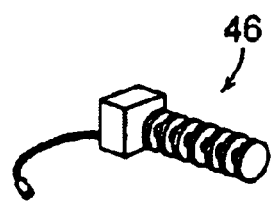
FIG. 4d is a perspective view of a high gain directional antenna adapted for use with the transceiver of FIG. 1, in accordance with the present invention.
Figure 4C:
FIG. 4c is a perspective view of a directional antenna adapted for use with the transceiver of FIG. 1, in accordance with the present invention.

As best seen in FIGS. 4a–4d, a plurality of optional antennas can be used with either transceiver 20 of FIG. 2 or the long range connector 34 of FIG. 3. In particular, the four inch high mast antenna 40 of FIG. 4A provides moderately enhanced performance and an omnidirectional pattern; the twenty eight inch high phased array 42 of FIG. 4B provides substantially improved performance in all horizontal directions. The six inch flat square panel 44 of FIG. 4C provides substantially improved performance in a single direction, and the thirty inch long tube of FIG. 4D provides dramatically improved performance in a single direction by providing a highly directional beam width. The standard antenna 28 included with either the long range connector 34 of FIG. 3 or the long range transceiver 20 of FIG. 2 is an omni-directional antenna having vertical polarization and a spherical radiation pattern. The standard antenna 28 is built into the transceiver or connector housing and does not require an added cable. The four optional antennas of FIGS. 4a–4d are adapted to be connected using selected cable links or connectors, as required for a specific application.

Transmitted data is directly modulated onto a synthesized carrier by use of minimum shift keying (MSK) modulation. The receiver is a dual conversion super heterodyne, down converting the received signal first to a 315 MHZ intermediate frequency (IF) signal and then down converting a second time to a 10.7 MHZ IF signal. Demodulation is accomplished using a limiter/discriminator circuit and the demodulated data is recovered from the demodulator output by processing through a comparator. First and second local oscillators (LOs) are controlled in frequency by use of a single loop indirect frequency synthesis. Samples of both first and second voltage controlled oscillators (VCOs) are divided down using phase-locked loop integrated circuit elements, where each sample is compared to an onboard 8 MHZ crystal reference oscillator. During the transmit interval, a single transmitter VCO is controlled by the same device and in the same manner.

To minimize total power consumption within the transceiver, portions of circuitry not in use during either the transmit or receive intervals are disabled under control of the system controller.

Frequency management is accomplished by a method incorporated in the transceiver control software. The transceiver initially powers up in an "idle slave" mode and operates in receive mode only, stepping through all 75 hop frequencies while "listening" for an incoming header packet matching the idle slave's local address. When data is presented to a transceiver via its local communication port, the transceiver immediately shifts from idle-slave mode to a "master search" mode wherein the master transmits and then listens for (receives) an acknowledgment signal from a targeted remote slave device (i.e., a transceiver in idle slave mode). The transmit and receive periods each represent one-half of a complete hop interval. The master continues to search for the slave device until a valid acknowledgment is received or until a predetermined time-out period expires. The initiation of master search mode starts at whichever hop frequency the transceiver was previously using while in idle slave mode and continues to step through the hop table selecting frequencies in turn. Since the incoming data is a synchronous in nature, the master transceiver essentially begins this process at a random point within the hop table.

An idle slave device, after receiving a valid header data packet, transmits an acknowledgment packet during the master's listening phase of the hop interval, thereby creating a synchronized and linked session for data transfer. Once linked, the master and slave transceivers increment through all 75 entries in the hop table for as long as incoming data is present on either unit, after a programmable time-out period. The master transmits during the first half of each hop interval and the slave transmits during the second half of the interval with the slave device adjusting its response time in accordance with the received packet, thereby maintaining synchronization between both master and slave devices. When neither master nor slave has any additional data to transmit, both units return to the idle slave mode after a programmable time-out period.

The transceiver RF Board consists of a transmitter, receiver, frequency synthesizer and T/R Switch. Each of these sections is controlled by MPU 32 to either transmit serial data or receive serial data.

Turning now to the transmitter section of transceiver 20, the basic transmitted signal is generated by a voltage-controlled-oscillator (VCO) that operates in the 2.4 to 2.4835 GHZ frequency band. The signal is then amplified by three stages of amplification. All three amplification stages and the VCO are switched ON for transmit and switched OFF for receive by the MPU 32. Frequency control and modulation will be described in the description of the frequency synthesizer.

The first stage of amplification is provided by a bipolar transistor capable of generating at least 10 dBm output power. It is used to boost the signal generated by the VCO to drive an exciter stage and to provide some isolation between the power stages and the VCO. The base bias on both the VCO and bipolar amplifier is controlled to provide the transmit ON/OFF function. The exciter stage boosts the power to at least 20 dBm to drive the power amplifier stage having a GaAs RF Power FET. A power control circuit is used to generate the GaAs RF Power FET gate bias voltage. The circuit is a closed loop control circuit that controls the level of drain current. Different drain current settings are used to control the output power of the amplifier. This includes the OFF state for receive as well as three other power levels. The power level settings are programmed via two control lines accessible at the RF Board connector. The circuit also controls the turn-on and turn-off times so that spectral splatter can be reduced.

The power amplifier stage provides 26 dBm of output power to drive the antenna. This stage also uses a GaAs RF Power FET and a similar power control circuit. The same two control lines that control the exciter power level also control the power amplifier power level. The transmitted signal passes through the T/R switch and a 2.44 GHz 4-pole bandpass filter to the antenna. Both the T/R switch and the bandpass filter are implemented using strip line on a separate daughter board.

The frequency synthesizer generates the modulated transmit signal, the receiver first LO, and the receiver $2^{nd}$ LO. Each of these is phase locked to the on-board 8 MHZ reference. The 8 MHZ reference is a crystal oscillator that is controlled by the off-board microprocessor. To enable a cost effective solution for the reference, an inexpensive crystal is utilized. Because a frequency tolerance of 3 parts per million (ppm) must be maintained for the transceiver to communicate, a frequency compensation routine is programmed in the MPU 32. The compensation deals with both the initial crystal manufacturing tolerance and maintaining tolerance over the specified −20 to 60 degrees Celsius temperature range.

The transmitted signal is generated by a VCO, switched on during transmit, operating over a 350 MHZ tuning range roughly centered on 2.44 GHZ. During operation the VCO only tunes in the 2.4 to 2.4835 GHZ band. Having a larger tuning range allows for manufacturing tolerances without the need to tune the oscillators for each manufactured board. When data is presented to the serial port of digital board 30, the transceiver is programmed to hop on 75 frequencies in the 2400–2483.5 MHz band. The dwell time for each hop is 33 ms. During a single hop the carrier is frequency modulated (i.e., MSK modulated) with the transmit serial data stream from the digital board. Immediately after the transmit time period the radio switches to the receive mode.

Figure 5:
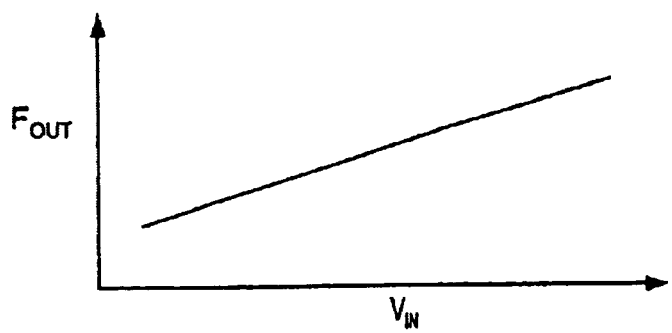

FIG. 5 illustrates an ideal VCO tuning transfer function, expressed in terms of Frequency ($F_{out}$) as a function of Voltage in ($V_{in}$). The curve of FIG. 5 is "ideal" in the sense that the slope of the function, $\partial F_{out}/\partial V$, is constant. For every increment of $V_{in}$ change, up or down, a constant change in $F_{out}$, up or down, is obtained. This ideal behavior allows the radio designer to ignore the beginning or present frequency of the VCO. Unfortunately, such ideal VCOs are not yet available at reasonable prices.

Figure 6:
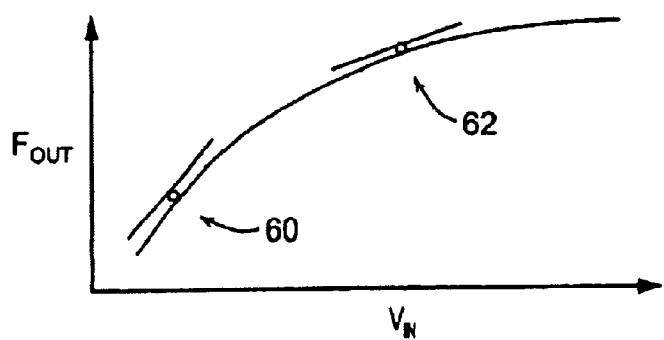
Figure 7:
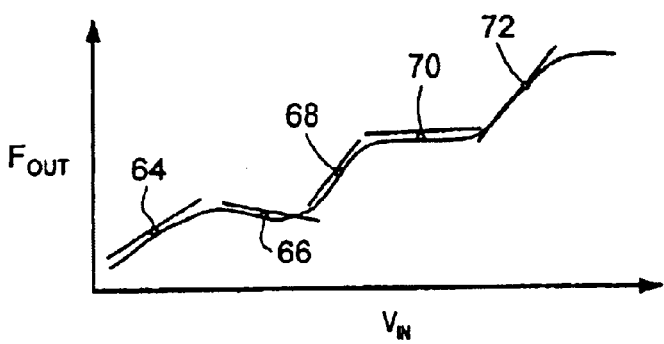

Instead, FIG. 6 illustrates a typical VCO transfer function, Frequency as a function of Voltage in, where the slope of the function, $\partial F_{out}/\partial V_{in}$, is not constant. For the more typical VCO transfer function, the slope at a first frequency 60 differs markedly from the slope at a second frequency 62. The effect of the variability of the slope is that the effect of changing VCO Voltage in depends, in part, on the beginning or present frequency; as can be seen from inspecting the graph of FIG. 6, changing $V_{in}$ a selected increment at frequency 60 will provide a greater change in $F_{out}$ than at frequency 62. Each VCO will provide a specific change in frequency for a given change in input control voltage signal; the change will be dependant, in part, on the beginning or present frequency. In accordance with the method of the present invention, the entire VCO transfer function, and the required $V_{in}$ is predicted by obtaining a complete set of VCO characterization measurements beforehand, and storing them in memory for later use. Any VCO can be characterized; as an example, FIG. 7 illustrates an arbitrary, yet characterizable, VCO transfer function, Frequency as a function of Voltage in. For the hypothetical VCO of FIG. 7, $F_{out}$ is subdivided into a sequence of concatenated discrete operational windows, e.g., five, represented by the constant slope lines centered about selected frequencies 64, 66, 68, 70, 72, wherein the approximation of constant slope in each window provides an accurate approximation of the overall VCO transfer function. Even this VCO transfer function is readily broken down into five contiguous frequency windows, each having a distinct constant slope and which, taken together, closely approximate the continuous transfer function curve. Within each constant slope window, the change in $F_{out}$ for each change in $V_{in}$ is known.

Figure 8:
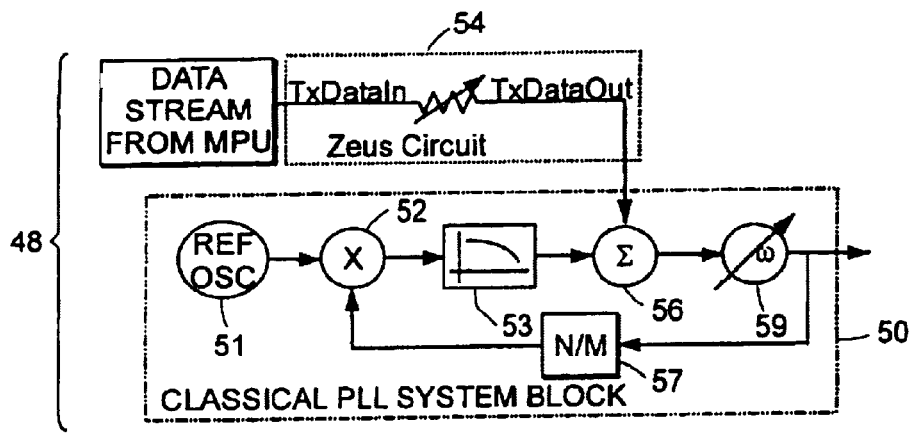
FIG. 8 is a system level block diagram illustrating the wireless data telemetry transceiver modulation index control system of the present invention.

FIG. 8 is a system level block diagram illustrating a wireless data telemetry transceiver modulation index control system 48, in accordance with the present invention. In order to perform the MSK modulation when transmitting, a digital data stream is summed with the output of reference oscillator 51 in a classical PLL system block 50, as illustrated in FIG. 8 and including reference oscillator 51, comparator 52, low pass filter 53, summing junction 56, feedback N/M divider chain 57 and pre-characterized VCO 59. The data stream is processed through a digitally controllable programmable attenuator 54 prior to input to the summing junction 56.

In accordance with the method of the present invention, during the transceiver manufacturing process, each transceiver's transmit VCO is completely characterized across the entire operating frequency band to determine the amount of attenuation required in the programmable attenuator 54 to achieve a fixed level of frequency deviation for optimum modulation. The VCO characterization data is then stored in the transceiver's on-board EEPROM memory as a look-up table belonging to the overall calibration data set.

Preferably, the entire frequency band of interest is subdivided into four windows, each with an assigned three bit attenuation level. If, in the future, a VCO's transfer function should change, the algorithm and attenuation circuit can be used with an arbitrarily large number of windows and/or attenuation steps as required to compensate for the VCO's response.

Figure 9:
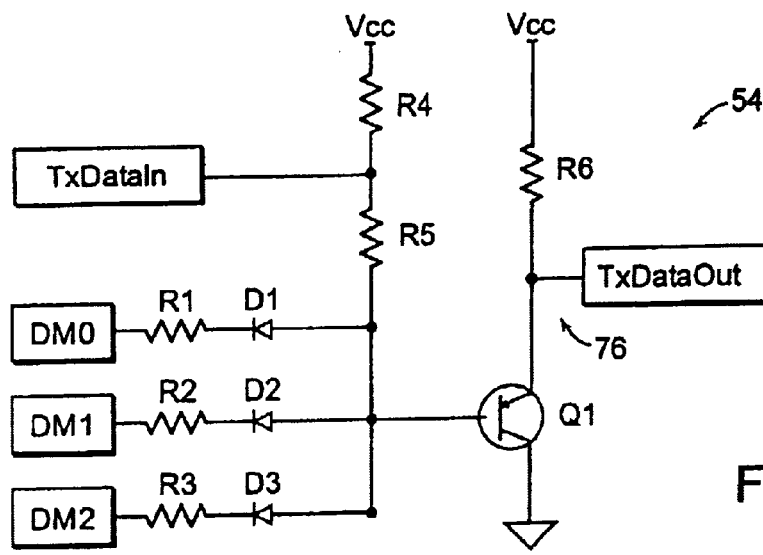
FIG. 9 is a schematic diagram illustrating the Programmable Attenuator circuit of the wireless data telemetry transceiver modulation index control system, in accordance with the present invention.

FIG. 9 is a schematic diagram illustrating programmable attenuator circuit 54 of modulation index control system 48, in accordance with the present invention. The transmitted data stream from MPU 32 enters at the node entitled TxDataIn and is directed to a R5 connected in series with the base of transistor Q1. Programmable attenuator circuit 54 has control input lines labeled for control signals DM0, DM1 and DM2 to represent binary weighted inputs for reducing the transmitted data stream to any one of eight possible discrete levels by effectively shifting the bias point of Q1 (preferably, a PNP transistor with high gain (Beta) is used). Each control input line includes a resistor in series with a diode, and so control line DM0 includes the series combination of R1 and D1, control line DM1 includes the series combination of R2 and D2 and control line DM2 includes the series combination of R3 and D3. The three control lines, DM0, DM1 and DM2 are arrayed in parallel and each is connected to a node coupled to the base of transistor Q1. A data extraction node identified as TxDataOut is connected to the emitter of transistor Q1 and to a pull up resistor R6.

A low input signal level (0 Volts) on any of the control lines DMx (i.e., DM0, DM1, or DM2) is required to activate that particular attenuation control segment. Depending on the individual ratios used for each resistor R1, R1 and,R3 and their total value compared to R5, a variety of attenuation step intervals can be achieved. For proper operation, the net resistance of resistors R1, R2, R3, and R5 compared to R6 should be within a one-to-ten range, assuming a transistor gain for Q1 of greater than one hundred.

If all of the control lines, DM1, DM2, and DM3, are set to a logical high (e.g., +5V), the smallest attenuation of the transmitted data stream is generated in programmable attenuator circuit 54. Alternatively, if all of the control lines, DM1, DM2, and DM3, are set to a logical low (e.g., +0V), the largest attenuation of the transmitted data stream is generated. Other combinations of actuated control lines will generate various intermediate results. Transistor Q1 functions as both a buffer and a summing point for the attenuator control and transmitted data stream. Resistor R4 provides a pull-up node when initially powering up, before the MPU has had an opportunity to initialize the TxDataIn control line.

In operation, programmable attenuator 54 provides a selectively attenuated data signal that is coupled to PLL summing junction 56 to generate a modulated data signal for transmission. Programmable attenuation circuit 54 dynamically adjusts the transmit data stream voltage level required to achieve a fixed level in frequency deviation based on the then present or current operating frequency. As noted above, each VCO (e.g., 59) provides a specific change in frequency for a given change in input control voltage signal; the change will be dependant, in part, on the present, pre-adjustment frequency.

In the method of the present invention, the change is predicted by obtaining a complete set of VCO characterization measurements beforehand. Those characterization measurements are stored in memory and MPU 32 is programmed to control programmable attenuation circuit 54 to provide the exact selectively attenuated signal level required for the VCO input control signal at the required frequency.

Figure 10:
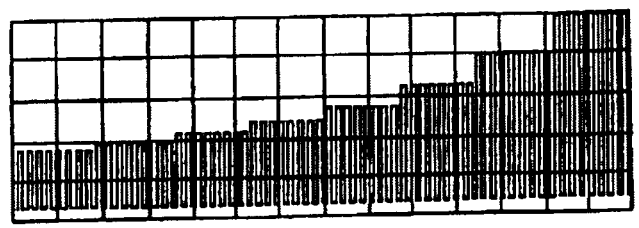
FIG. 10 is a graph of transmit data level as a function of time, illustrating operation of the wireless data telemetry transceiver modulation index control system of the present invention.

FIG. 10 is a graph of transmit data level as a function of time as measured at TxDataOut node 76, between R6 and the emitter of transistor Q1, illustrating operation of the wireless data telemetry transceiver modulation index control system 48 and demonstrating the various Transmit Data levels produced when shifting the attenuation levels (DMx) from a minimum to its maximum level (i.e., 8 discrete steps).

In the embodiment illustrated, eight steps are possible because three programmable control lines are actuable by the MPU (i.e., $2^3$=8). For greater resolution, a greater number of control lines could be employed.

In the preferred embodiment, the transceiver is programmed to execute the following method steps when actively exchanging data with another transceiver:

A—the MPU sends the next selected TX frequency to the PLL, thereby setting the N/M divider chain in the feedback loop of the PLL;

B—the MPU sets the programmable attenuator for the selected frequency, based on the VCO characterization data stored as a look-up table value(s) in the EEPROM C—the MPU streams out transmit data;

D—the MPU sends the corresponding RX frequency information to the PLL;

E—incoming data is received;

F—return to step A and repeat the sequence of steps.

The method and circuits of the present invention provide a fixed level of frequency deviation in the VCO transfer function across the transceiver's entire operational bandwidth, thereby providing an optimum receiver signal to noise (S/N) ratio for the transceivers receiving the transmitted, modulated signal. Since transceivers within the system communicate with other, substantially identical transceivers, the receiver sections in each transceiver can incorporate less complex data demodulator circuitry, which can be manufactured for a reduced cost. The demodulator data threshold and recovery circuitry can be less complex because, in the received signal, output voltage level varies little across the range of input frequencies.

It will be appreciated by those skilled in the art that the method of the present invention, broadly speaking, includes the following steps: (a) selecting a voltage controlled oscillator; (b) characterizing the voltage/frequency transfer function of the voltage controlled oscillator over a selected frequency range to generate voltage controlled oscillator transfer function characterization data; (c) storing the voltage controlled oscillator transfer function characterization data in a memory; (d) generating a transmit data stream; (e) selecting a first transmit frequency; (f tuning the voltage controlled oscillator to said first frequency; (g) selecting or hopping to a second frequency distinct from the first frequency; (h) retrieving the voltage controlled oscillator transfer function characterization data from memory; and (i) adjusting (e.g., by attenuating) the amplitude of the transmit data stream in accordance with the voltage controlled oscillator transfer function characterization data to achieve a selected modulation depth.

In as much as the present invention is subject to various modifications and changes in detail, the above description of a preferred embodiment is intended to be exemplary only and not limiting. It is believed that other modifications, variations and changes will be suggested to those skilled in the art in view of the teachings set forth herein. It is therefor to be understood that all such variations, modifications and changes are believed to fall within the scope of the present invention as defined by the appended claims.

What is claimed is:

1. A frequency hopping transmitter for use in a wireless data telemetry system and being adapted to generate a modulated signal having a modulation index, comprising:

a memory unit adapted to store voltage controlled oscillator transfer function characterization data for a selected voltage controlled oscillator;

a microprocessor unit connected to said memory unit and generating a binary transmit data signal and a first binary attenuator actuation signal, said first attenuator actuation signal being generated in response to said voltage controlled oscillator transfer function characterization data;

a phase locked loop circuit including a reference oscillator, a phase detector connected to said reference oscillator, and a summing junction responsive to said phase detector and having a modulator input, said phase locked loop circuit also including a selected voltage controlled oscillator, said selected voltage controlled oscillator being responsive to said summing junction;

a programmable attenuation circuit responsive to said microprocessor unit binary transmit data signal and having a first control input for generating an attenuated binary transmit data signal in response to receiving said first attenuator actuation signal on said first control input;

said phase locked loop summing junction modulator input being responsive to said programmable attenuation circuit attenuated binary transmit data signal to selectively adjust the modulation index of the transmitter.

2. The frequency hopping transmitter of claim 1, wherein said microprocessor unit generates a second binary attenuator actuation signal, said second attenuator actuation signal being generated in response to said voltage controlled oscillator transfer function characterization data.

* * * * *